(Model.)

5 Sheets—Sheet 1.

H. SMITH.
MACHINE FOR MAKING WIRE FENCES.

No. 297,461. Patented Apr. 22, 1884.

WITNESSES
Phil C. Disterich
T. F. Holden

INVENTOR
Homer Smith
per Hallock & Hallock
Attorney (Model.)               H. SMITH.          5 Sheets—Sheet 2.

MACHINE FOR MAKING WIRE FENCES.

No. 297,461.               Patented Apr. 22, 1884.

WITNESSES                        INVENTOR

Phil C. Dietrich.            Homer Smith
T. F. Holden.               per Hallock & Hallock
                                    Attorneys (Model.)
5 Sheets—Sheet 3.
H. SMITH.
MACHINE FOR MAKING WIRE FENCES.
No. 297,461.  Patented Apr. 22, 1884.
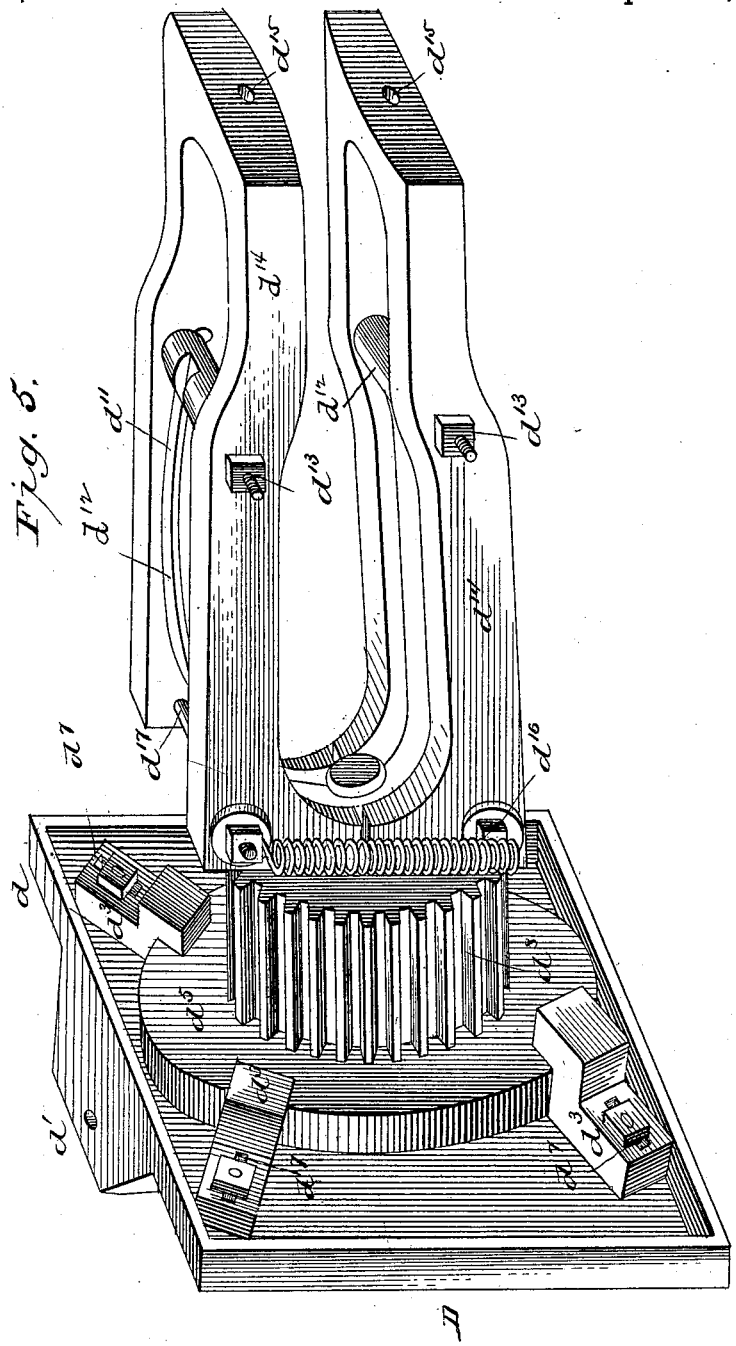

(Model.)　　　　　　　　　　　　　　　　　5 Sheets—Sheet 4.
H. SMITH.
MACHINE FOR MAKING WIRE FENCES.
No. 297,461.　　　　　　　　　Patented Apr. 22, 1884.
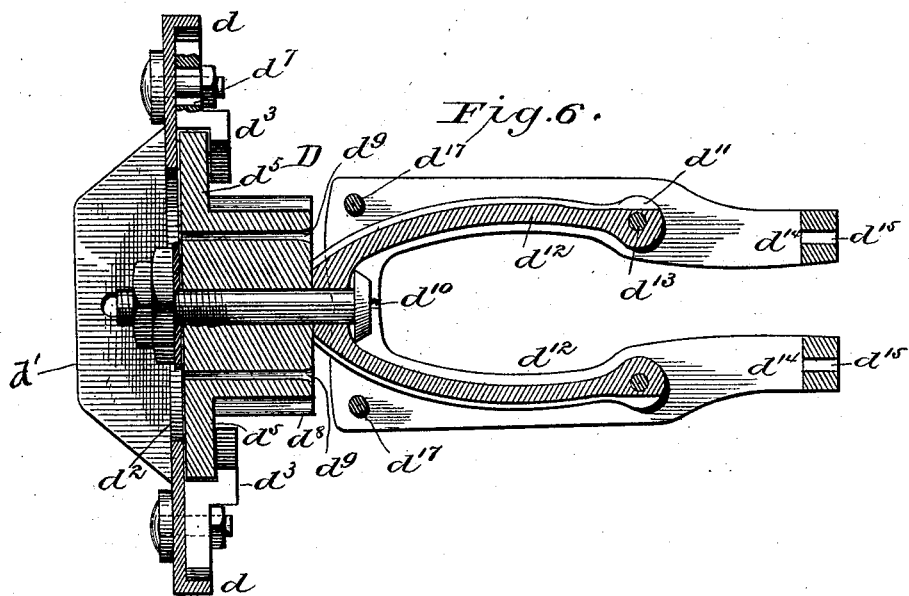
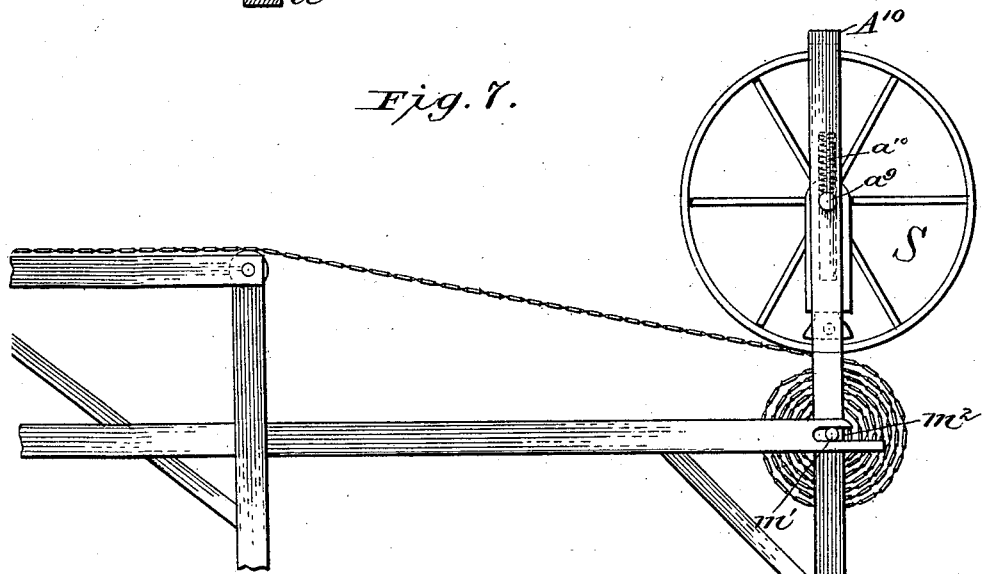
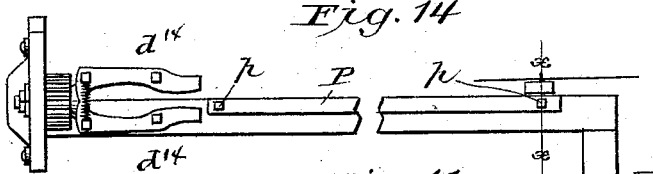
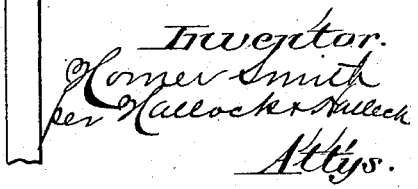
Attest:
A. M. Long.
Charlie Thom
Inventor.
Homer Smith
per Hallock & Hallock
Attys.

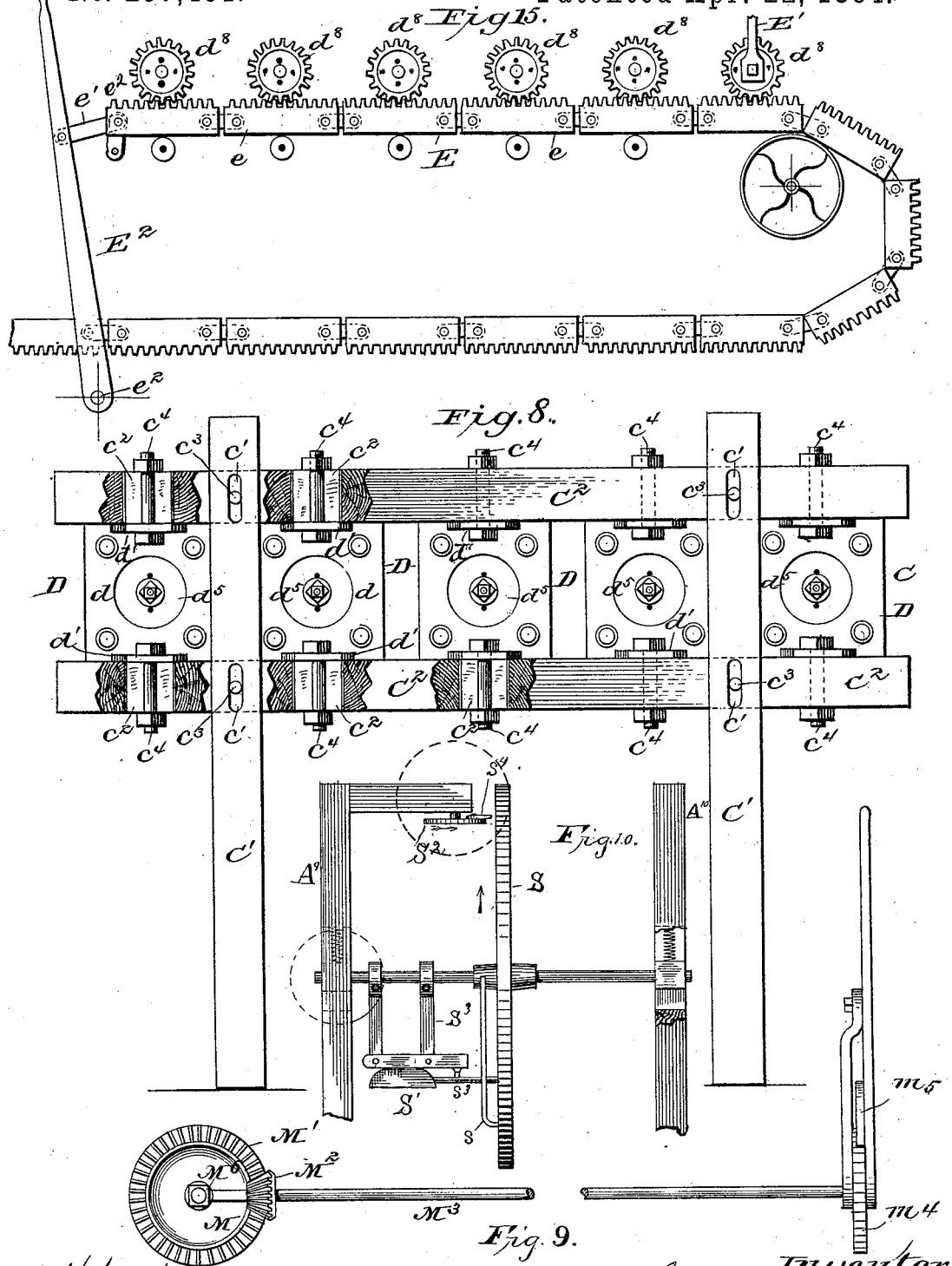

UNITED STATES PATENT OFFICE.

HOMER SMITH, OF KIRKSVILLE, MISSOURI.

MACHINE FOR MAKING WIRE FENCES.

SPECIFICATION forming part of Letters Patent No. 297,461, dated April 22, 1884.

Application filed July 10, 1883. (Model.)

*To all whom it may concern:*

Be it known that I, HOMER SMITH, a citizen of the United States, residing at Kirksville, in the county of Adair and State of Missouri, have invented certain new and useful Improvements in Machines for Making Wire Fences; and I do hereby declare the following to be a full, clear, and exact description of the invention, such as will enable others skilled in the art to which it appertains to make and use the same.

My invention relates to machines for making wire and picket fences, and particularly that class of fences shown and described in Patent No. 257,387, granted to me the 2d day of May, 1882.

The nature and objects of my invention will more fully appear from the subjoined description and claims, reference being had to the accompanying drawings, in which—

Figure 1:
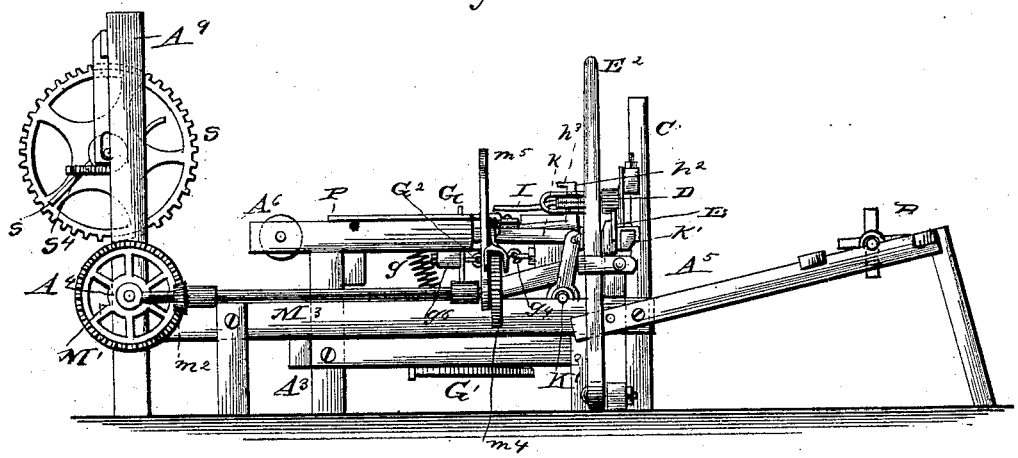
Figure 2:
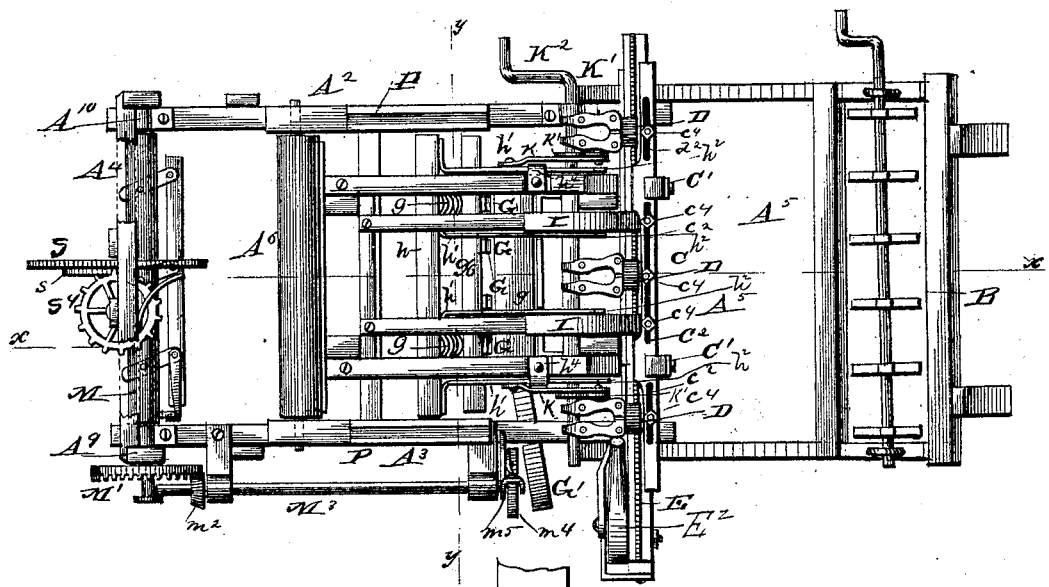
Figure 12:
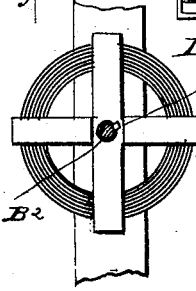
Figure 3:
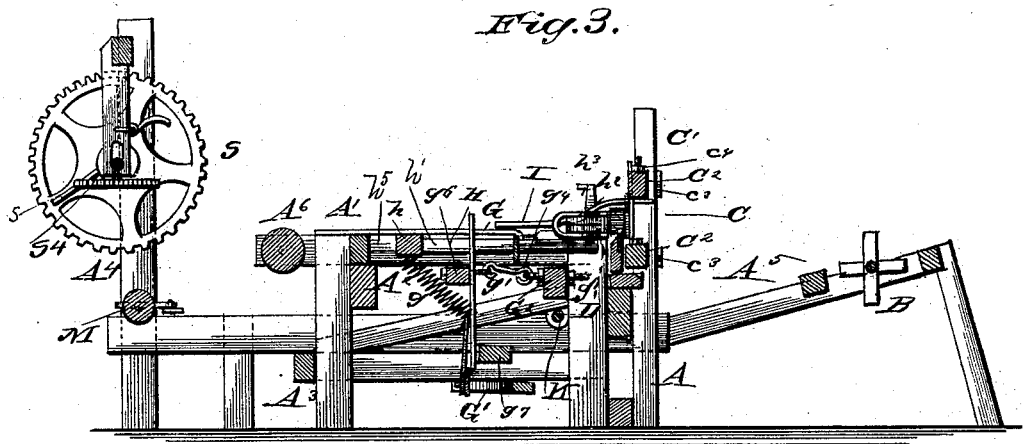
Figure 4:
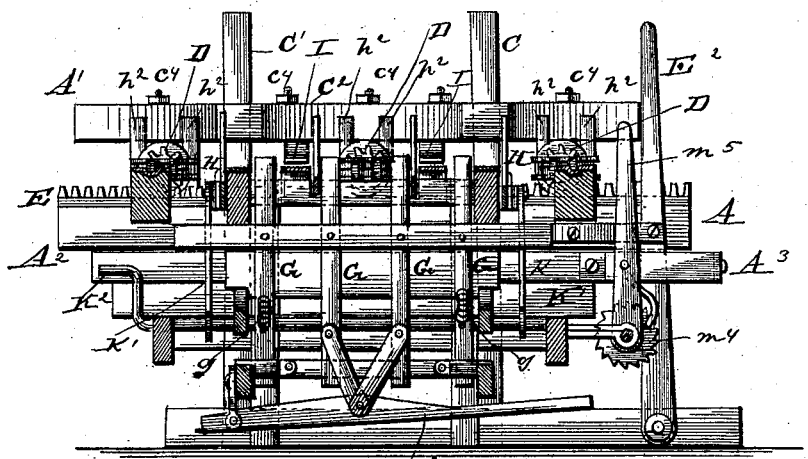
Figure 13:
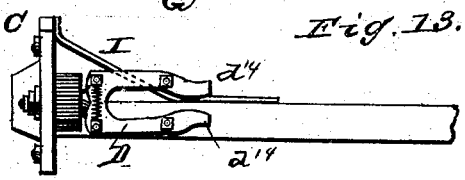

Figure 1 represents a side elevation; Fig. 2, a top plan view; Fig. 3, a longitudinal section on line $x$ $x$, Fig. 2; Fig. 4, a transverse section on line $y$ $y$, Fig. 2; Fig. 5, a perspective of the head detached from the frame; Fig. 6, a longitudinal section of the head; Fig. 7, a side elevation of part of the frame and registering mechanism; Fig. 8, an end elevation of the machine proper, showing the adjustable frame C; Fig. 9, an elevation of the propelling-rod and its connections; Fig. 10, an end elevation of Fig. 7; Fig. 11, a section through the rail having part P thereon; Fig. 12, a detail in section through the reel-frame; Fig. 13, an elevation showing the spring for holding the slat against the top of the frame; Fig. 14, an elevation showing the grooved iron; Fig. 15, a detail showing a modified form of rack.

A represents the frame of the machine; B, the frame for holding the coils of wire to be used in making the fence. The frame A consists of a top, $A'$, side $A^2$ and $A^3$, front end, $A^5$, and rear end, $A^4$, and minor details, which will hereinafter be described. Upon the front end, $A^5$, is attached an adjustable frame, C, consisting of uprights $C'$ and transverse pieces $C^2$. The uprights $C'$ are provided with longitudinal slots $c'$, through which bolts $c^3$ pass and hold the uprights in contact with the pieces $C^2$. The object of the slots $c'$ is to give the bolts $c^3$ sufficient play to permit the cross-pieces to be vertically adjusted. The transverse pieces $C^2$ are provided with longitudinal slots $c^2$ for the bolts $c^4$, which hold the base $d$ of the head D by means of lugs $d'$. By unloosening the bolts the heads may be shifted the length of the slots $c^2$, so that the pickets may be bound at different points, when desired. The base $d$ of the heads D is provided with an opening, $d^2$, and adjustable clamps $d^3$, which hold a disk, $d^5$, against the base $d$, and with the latter form a bearing for said disk $d^5$ when it is revolved. The clamps are provided with a slot, $d^7$, which permits of the clamps being adjusted to take up the wear of the disk $d^5$. Upon the disk $d^5$ is a pinion, $d^8$, which is provided with openings $d^9$ for the wire to pass through, and a hole in the center for bolt $d^{10}$, which clamps the back of the jaws $d^{12}$ against the pinion $d^8$. These jaws are made curved, so that the pickets can be readily introduced and passed to the forward end. Upon the outer side of the jaws are formed grooves $d^{11}$, which correspond in location with the openings $d^9$, of which they form a continuation for the wires to pass to the end of the head.

Pivoted to each jaw $d^{12}$ by means of bolts $d^{13}$ are jaws $d^{14}$, which have an eye, $d^{15}$, for the wire to pass through and be twisted. The pivoted jaws are curved upon their inner sides in a manner similar to the fixed jaw and for the same purpose, and the ends that project beyond the fixed jaws are nearly straight, so as to form a guide for the pickets in passing to the frame. The parts of the pivoted jaws nearest the pinion are joined together by springs $d^{16}$, which are attached to rods $d^{17}$, that extend across the space at the ends. By these means a uniform tension is given to the wires when twisted, and all the heads will thereby have a uniform twist. The heads are revolved by means of an oscillating rack, E, operated by lever $E^2$, fulcrumed at its lower end to the frame and connected to the rack by a link, $e'$. If desired, a series of sections, $e$, joined together to form a belt, may be substituted for the rack E and operated by the lever $E^2$ in the same manner as the rack. When it is desired to use the sections $e$ $e$ as a belt, the ends $e^2$ $e^2$ are joined together by a link and motion imparted to the whole series by a crankarm, E', on one of the heads. When used in this manner, the lever E² is disconnected from the sections. The pickets are placed in the slots of the head, and when passed through the openings rest upon the top of the sides A² and A³. To regulate the distance between the pickets the stops G are provided. These stops are held above the frame by means of springs $g$, which are attached at one end to the frame and at the other to the lower end of the stops. When it is desired to pass a picket beyond the stops, the latter are depressed by means of lever G', which is fulcrumed to the frame. As it may sometimes be necessary to vary the distance between the pickets, means are provided for regulating the distance of the stops from the heads. In the present instance the upper part of the stops are provided with a rod, $g'$, connected to a rod, $g^2$, by a link, $g^4$. The rod $g^2$ is screw-threaded, and passes through the part G², and is held in place by screw-nuts, which permit of the adjustment of said rod, so that the distance between the parts $g^6$ and G² can be regulated. As many of the connecting-rods as needed can be used. One at each end, however, will be sufficient.

After the wire has been twisted between the head and picket the latter is moved forward, so that another picket may be placed in the heads for attachment to the wires. To accomplish this a beater-frame, H, is attached to the upper side rails of the frame A. It consists of a cross-piece, $h$, and arms $h'$, which are attached in any suitable manner to cross-piece $h$, and provided with an upward projection, $h^2$, having a lip, $h^3$, that embraces the front side of the picket and prevents the latter from jumping over the front end of the frame. To hold the beater in place, loops $h^4$ are attached to the frame for holding arms $h'$ and grooves $h^5$ for holding the end or cross-piece $h$ in place, but permitting of a longitudinal movement of the beater. Ordinarily the end $h^2$ of the beater is between the heads, and the stops G between the arms $h'$. To move the beater backward and forward a system of levers is employed. In the drawings the beater is shown connected to a species of toggle-lever, K, formed of two arms, $k$ $k'$, on each side of the frame. The arms $k$ are pivoted at their upper ends to the outer arms, $k'$, of the beater-frames at a point near the cross-piece $h$. The lower ends are pivoted to the upper ends of arms $k'$, which are fixed to a rock-bar, K', journaled in the sides of frame A. This bar is rocked by a crank, K², which, when in position shown in Figs. 1 and 8, holds the ends $h^2$ of arms $h'$ near the heads, and when turned to the position shown in dotted lines, Fig. 8, moves the frame toward the rear of the machine and the picket in the same direction. The arms $k$ $k'$ may be provided with slots to permit of their being adjusted for an obvious purpose.

After the pickets have been combined with the wire, the fence is passed over the end of the frame, or a roller, A⁶, at the end of the frame, to a winding-roller, M, to which it is attached by means of pivoted catches $m$. As soon as a sufficient amount of the fence has been wound upon the rollers, it may be removed from the frame, as its journal $m'$ rests in the open bearings $m^2$, and the fence may be bodily removed from the roller by dropping the pivoted catches $m$ into slots $m^3$ in the roller. One end of the roller is provided with a miter-gear wheel, M', which meshes with a miter-gear wheel, M², on the shaft M³. This shaft is journaled upon the outer side of side A² of the frame A, and to the shaft of the roller by means of gage-washer $m^6$, Fig. 7. It is also provided at its front end with a ratchet-wheel, $m^4$, operated by a pawl, $m^5$, the handle of which is journaled upon the shaft M³.

In this class of machines it is desirable to measure the fence as it is wound upon the roller M, so that any desired number of feet may be wound upon the roller and cut off. This is accomplished by journaling a friction-wheel, S, in the vertical extensions of uprights A⁹ and A¹⁰, which support the rear end of frame A. This wheel is journaled in bearings $a^9$, the springs $a^{10}$ of which hold the wheel upon the roller M or the layers of fence wrapped therein, and permit the wheel to rise as the thickness of the layers upon said rollers increases. Upon one side of the wheel is a radial flange, $s$, which, as the wheel revolves, alternately strikes a gong or alarm, S', and a register, S². The gong S' is attached to a frame, S³, which may be loosely suspended from the shaft, or attached to the upright A⁹. Upon the frame is pivoted a hammer, $s^3$, which, when moved by the flange $s$, strikes the gong and notifies the operator that a length of the fence equal to the circumference of the wheel S has been wound upon the roller M.

The register S² may be of any of the well-known forms, and is suspended from an arm, which may be adjusted upon the upright A⁹. It is also provided with a lever, $s^4$, which, when moved by the flange $s$, will indicate that a length of the fence equal to the circumference of the wheel S has been wound upon the roller M. By placing the gong and register so that the wheel will strike them at different times the operator is warned by the gong that the flange $s$ is approaching the register. This is of some importance to the operator, as he will then know, if he desires to cut at the next time the flange reaches the register, how many pickets to put in before the flange reaches that point.

The operation of the machine is as follows: The wire is run from the reels on frame B, through the openings in the heads D, and clinched or run to the roller M. A picket is then placed in the curved part of the heads and forced by the beater through the open ends of the pivoted jaws to the stops G. The heads are now revolved by moving the rack or rack-belt until the wire has been twisted between the heads and the picket, the stops are dropped, the picket forced back by the beaters, and the stops raised to prevent the picket from being drawn toward the heads. The beater is drawn back, and a second picket is then placed in the position of the former picket, and the heads revolved in the opposite direction, and so on until sufficient fencing has been made.

Having described the general construction and operation of the machine, I will now proceed to describe several minor features that may be applied to my device.

In Fig. 13 is shown a strap-spring, I, attached at its upper end to the part C, and projecting forward and between the heads D, and resting upon the top rail or upon the picket last sent forward. The object of this spring is to hold the picket firmly upon the top of the machine, so that when the springs are used it is not necessary to hold the beating-frame forward while the wire is being twisted. If desired, several of these springs may be attached to the frame. In some cases it may be desired to fix the wire to the pickets by means of staples. To accomplish this, I provide the grooved iron P, which is attached to and extends nearly the whole length of the top rail, (see Fig. 14,) so that the operator may drive the staples at any point. It is preferably attached by means of bolts $p$ on a line with the outside heads, D. The groove $p'$ is rounded, so that when the staple is driven through the picket it will turn and clutch the wire upon and set its points in the under side of the picket.

It will often be desirable to fill the reels B' without removing them from the frame. To accomplish this, I provide the shaft $B^2$ with a spline or key, $b$, by means of which the reels may be fastened to the shaft, which may be revolved by means of crank $B^3$. After the reels have been filled with wire, the key $b$ is removed, and they are free to revolve upon the shaft. If the wire on one of the reels should become exhausted, the reel may be refilled without disturbing the others by inserting its key and revolving the shaft $B^2$.

What I claim as new is—

1. In a machine for making wire fences, the combination of uprights, cross-pieces vertically adjustable upon said uprights, and heads adjustable upon said cross-pieces, substantially as described.

2. In a machine for making wire fences, the combination of uprights having longitudinal slots, cross-pieces having longitudinal slots and attached to the uprights by bolts, and adjustable heads between the cross-pieces, and held in place by bolts passing through the longitudinal slots in said cross-pieces, substantially as described.

3. In a machine for making wire fences, a head having a pinion for revolving it, stationary jaws attached to the pinion, and pivoted jaws attached to the stationary jaws, substantially as described.

4. In a machine for making wire fences, a head having jaws pivoted at their rear ends, substantially as described.

5. In a machine for making wire fences, a head having curved pivoted jaws and a gradually-reduced opening, for the purpose set forth.

6. In a machine for making wire fences, a head having a pinion provided with openings for the wire, stationary jaws attached to the pinion and having guide-grooves for the wire, and pivoted jaws having an opening for the wire to pass through and be twisted, substantially as described.

7. In a machine for making wire fences, a head having stationary jaws, and pivoted jaws attached to the stationary jaws, and provided with springs, for the purpose set forth.

8. In a machine for making wire fences, the combination of wire-twisting heads, stops adapted to be raised or lowered in front of the heads, movable beater-frames between the stops and heads, and springs rigidly attached by one end to the frame C, and the other end projecting forward between the heads and resting upon the top of the machine for holding the picket in place, substantially as described.

9. In a machine for making wire fences, the combination of a roller suspended in a frame, a wheel also suspended in a frame and having a radial flange, $s$, a register operated by said flange, and a bell having a hammer which is tripped by said flange when the wheel is revolved, substantially as described.

10. In a machine for making wire fences, the combination of a roller upon which the fence is wound, a wheel journaled in movable bearings and having a radial flange, and a registering apparatus operated by said flange, substantially as described.

11. In a machine for making wire fences, the combination of a frame having movable bearings, a wheel journaled in said bearings, and having an arm, and a registering apparatus operated by said arm when the wheel is revolved, substantially as described.

12. In a fence-making machine, the spring I, attached to the cross-head C, and having its free end projecting between the heads and resting upon the top of the machine.

13. In a fence-making machine, the combination of a roller, M, having miter-wheel M', a shaft, $M^3$, having one end journaled on the shaft of roller M, and having a miter-wheel $M^2$, gearing with said wheel M', and means, substantially as described, for revolving the shaft.

14. In a fence-making machine, a reel-frame having shaft $B^2$, reels B', and keys $b$, substantially as and for the purpose set forth.

15. In a machine for making wire fences, the combination of a plate having clamps and a central aperture, and a revolving head having a disk held in place by said clamps, substantially as described.

16. In a machine for making wire fences, the combination of a plate having adjustable clamps and a central opening, and a head having a disk held in place by said clamps, substantially as described.

17. In a machine for making wire fences, the combination of a frame having loops $h^4$ and grooves $h^5$, a beater, H, having arms $h'$ moving in said loops $h^4$, cross-pieces $h$, held in grooves $h^5$, and projections $h^2$, extending above the top of the frame, and toggle-levers $k$ and $k'$, attached to arms $h'$ and to a shaft, and said shaft having a crank, substantially as described.

18. In a machine for making wire fences, the combination of a frame having revolving heads and stops adjustable to and from the heads, substantially as and for the purpose set forth.

In testimony whereof I affix my signature in presence of two witnesses.

HOMER SMITH.

Witnesses:
JOHN A. WILLARD,
MARTIN HART.